United States Patent
Chen et al.

(10) Patent No.: US 6,973,142 B2
(45) Date of Patent: Dec. 6, 2005

(54) TIMING SYNCHRONIZATION FOR M-DPSK CHANNELS

(75) Inventors: Weizhong Chen, Austin, TX (US); Leo Dehner, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 75 days.

(21) Appl. No.: 10/391,978

(22) Filed: Mar. 19, 2003

(65) Prior Publication Data

US 2004/0184564 A1 Sep. 23, 2004

(51) Int. Cl.$^7$ ............................................. H04L 27/22
(52) U.S. Cl. ...................... 375/330; 375/283; 375/355
(58) Field of Search ................................. 375/283, 330, 375/354, 355, 362, 365, 371, 343; 370/503, 370/509, 516

(56) References Cited

U.S. PATENT DOCUMENTS

| | | | |
|---|---|---|---|
| 5,535,252 A | * | 7/1996 | Kobayashi .................. 375/371 |
| 5,812,207 A | * | 9/1998 | Cahill, III ................... 348/465 |
| 5,815,541 A | * | 9/1998 | Fukushi ....................... 375/376 |
| 5,854,808 A | * | 12/1998 | Peponides et al. .......... 375/224 |
| 6,424,673 B1 | | 7/2002 | Chen et al. |
| 2004/0017864 A1 | * | 1/2004 | Chen ........................... 375/343 |

FOREIGN PATENT DOCUMENTS

WO WO/01/80508 10/2001

OTHER PUBLICATIONS

Bluetooth SIG Radio Working Group, PHY Draft Specification , Version No. 0.5, date unknown.

* cited by examiner

Primary Examiner—Chieh M. Fan
(74) Attorney, Agent, or Firm—Toler, Larson & Abel, LLP

(57) ABSTRACT

The present invention discloses an improved method of timing synchronization with transmitted data packets in a receiver on a communication channel using differential phase shift keying (DPSK) modulation—especially an RF wireless communication channel. The invention reduces the complexity of the circuits, especially the multipliers, required for digital signal processing. The invention also increases performance compared to previously known methods.

23 Claims, 4 Drawing Sheets

TIMING SYNCHRONIZATION FOR M-DPSK CHANNELS

FIELD OF THE DISCLOSURE

This disclosure relates to wireless digital communication systems and more particularly to digital synchronization using differential phase shift signals.

BACKGROUND

In digital communications, binary information is communicated from a transmitter to a receiver via a sequence of symbols, and each symbol has a set of states. Different states of these symbols are used to represent the information bits to be transmitted. Each symbol may represent one or more bits.

In wireless digital communications, the signal to be transmitted is modulated by shifting its frequency center to a particular frequency, called the carrier frequency. One particular method of modulation is to alter the phase of the carrier frequency for a duration of a certain period, called a symbol period, where the phase of the symbol represents the digital information. This method of modulation is called phase shift keying (PSK).

The detection of PSK modulated symbols at a receiver requires an accurate match between the transmitter local oscillator frequency and the receiver local oscillator frequency. Any mismatch of the two frequencies will degrade the ability to recover the information bit stream at the receiver. The frequency difference between the two oscillators is called carrier frequency error as seen at the receiver. The impact of the frequency error to the receiver reliability can be minimized by using a Differential Phase Shift Keying (DPSK) modulation, where the information bits are encoded into the phase difference between the current symbol and the prior symbol. If the phase difference has M states, the DPSK modulation is called M-DPSK modulation.

In the simplest version of DPSK, called 2-DPSK, there are two possible phase differences between any neighboring symbols, typically zero and 180 degrees ($\pi$ radians). Thus each symbol represents one bit. By using more than two phase states, multiple bits may be represented by each symbol. For example, 4-DPSK represents two bits requiring 4 possible phase differences per symbol. In general, modulation methods of this kind are designated M-DPSK, where M is the integral number of possible phase changes, is typically a power of 2, and each symbol represents $\log_2 (M)$ bits.

In digital communications where multiple transmitters share a communications channel, the sequence of transmitted symbols contained in a single transmission is organized into a packet with a specific format. A packet typically contains different fields, such as a preamble field for AGC (automatic gain control), a synchronization field for the receiver to synchronize the transmitter in timing and carrier frequency, a message ID field, an error correction field, as well as data payload. To receive a packet, a receiver must synchronize its local frequency and packet arrival timing to that of the transmitter's. One example of such a specific digital communications implementation standard is known generally referred to as Bluetooth High Rate.

A widely-used approach to performing the timing synchronization between the receiver and the transmitter is to calculate the correlation of the incoming received signal with a predetermined synchronization pattern signal. In the correlation operation, a receiver multiplies a sequence of values representing the predetermined synch pattern signal with a sequence of the received signal values and sums the results of these multiplications to give the correlation. When the correlation result goes above a certain threshold, the receiver determines that a packet arrival is detected, and the time of the arrival is used to mark the location of each field mentioned above. This process is called timing synchronization. For each correlation calculation, a sequence of multiplications and additions is required to be calculated, and each multiplication is a multiplication of two multi-bit values. The correlation needs to be calculated as each sample is received. To normalize the correlation to compensate for unknown power levels of the incoming received signal, additional circuitry is required. This normalization operation requires a calculation of the same order as that for the correlation, resulting in a conventional synchronization approach that is power and cost inefficient.

Therefore, what is needed is a method and apparatus in a wireless communication system for facilitating a power and cost efficient timing synchronization to detect packet arrivals.

DETAILED DESCRIPTION OF THE FIGURES

The following describes a preferred embodiment of the present disclosure applied to timing synchronization of packets transmitted on a 2-DPSK channel. Extension of the methods to any other M-DPSK systems can be made easily by any person skilled in these arts.

Figure 1:
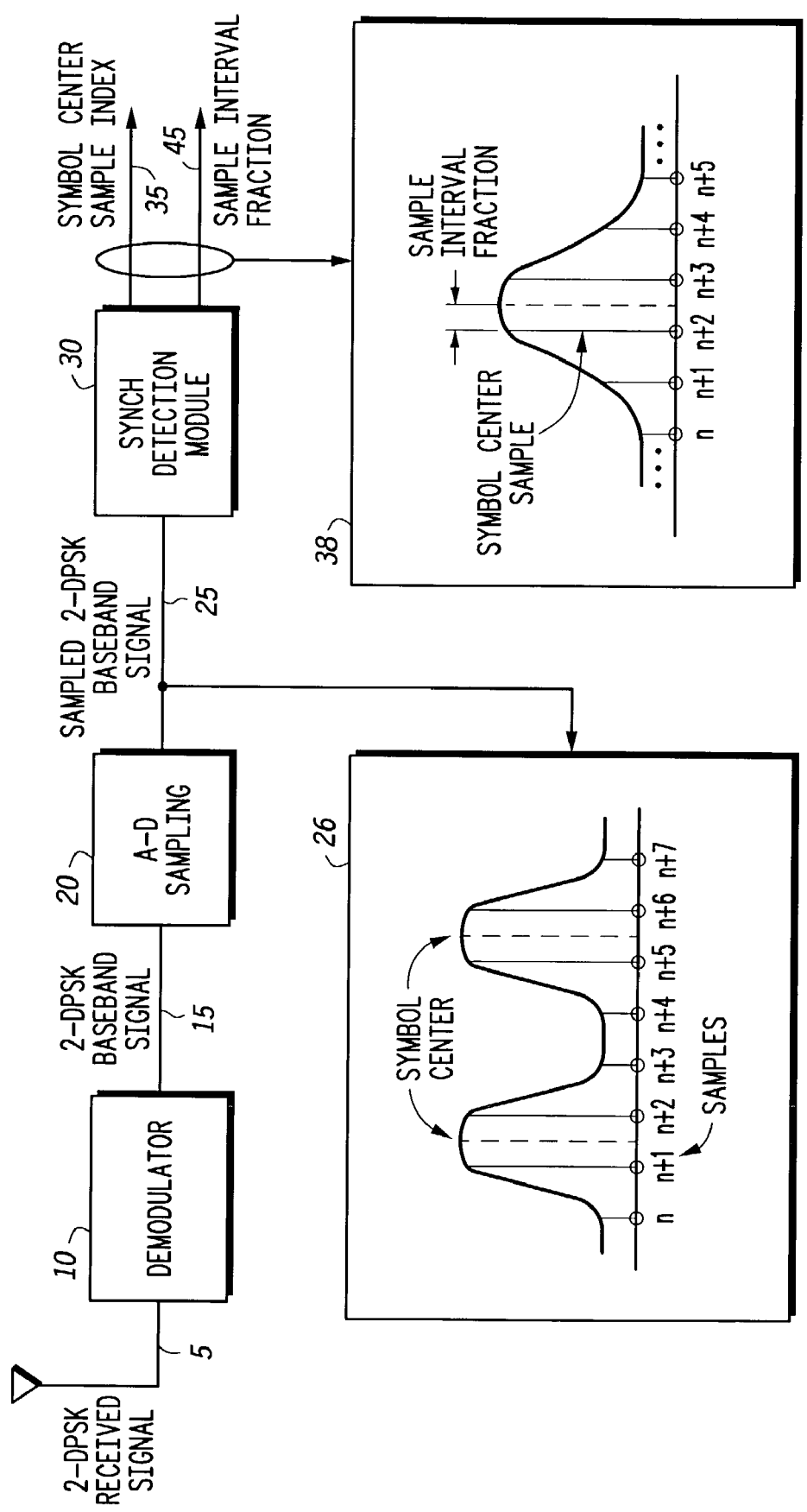
FIG. 1 is a block diagram of a portion of a wireless DPSK receiver that is relevant to symbol and packet synchronization using the present disclosure.

In FIG. 1, a demodulator 10 receives a transmitted signal 5 in which the carrier frequency has been modulated using 2-DPSK. Typically the transmitted signal will be a wireless signal, such as a Bluetooth High Rate or Medium Rate, compliant standard signal, or an 802.11(b) compliant standard. The demodulator 10 removes the carrier frequency to produce a 2-DPSK baseband signal 15. The signal 15 is a complex-valued signal, the real part of the signal 15 is in-phase signal (I) and the imaginary part of the signal is called quadrature signal (Q).

An Analog-to-Digital (A/D) Sampling Module 20 produces two sequences of digital sample values from the complex valued IQ signal 15. The view 26 illustrates the sampled signal 25 with a representation of two symbols. The center of each of the two symbols is indicated. The illustrated sampling rate at four samples per symbol is a typical sampling rate; however other sampling rates can be used.

The Sync Detection Module 30 uses the Sampled 2-DPSK Baseband Signal 25 to generate a symbol center sample index and a Sample Interval Fraction 45 value to represent the packet arrival timing or the start of the packet. More specifically, the Symbol Center Sample Index 35 and the Sample Interval Fraction 45 identify a particular symbol center's location in the packet, typically the first symbol of the sync pattern. This detected timing will be used to derive the timing of the rest fields of the packet. The Symbol Center Sample Index 35 indicates a sample prior to the symbol center, with reference to view 38 that represents a portion of a synchronization pattern signal; the sample n+2 is the indexed, or identified, sample. The Sample Interval Fraction 45 provides a fine time estimate of the symbol center from the Symbol Center Sample Index 35. The value of Sample Interval Fraction 45 represents a portion of a sample period that is used to provide a better timing resolution than that obtained by only an index to a specific sample.

Figure 2:
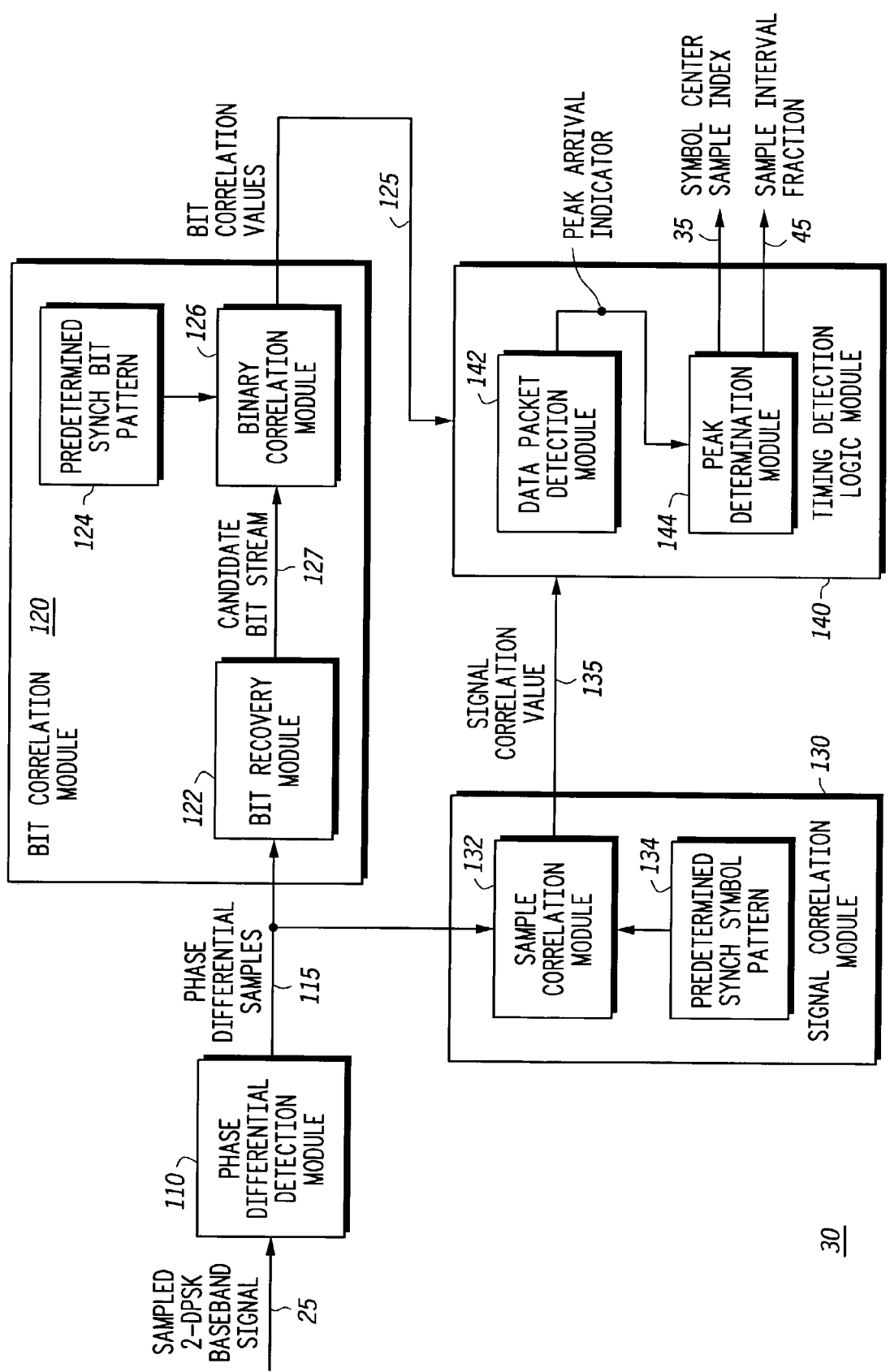
FIG. 2 is a block diagram of a sync detection module in accordance with the present disclosure.

In FIG. 2, a Phase Differential Detection Module 110 uses the complex-valued Sampled 2-DPSK Baseband Signal 25 to produce Phase Differential Samples 115, which are complex-values representing the phase difference between two signal values having a symbol separation. A symbol separation is understood to be the number of samples per symbol, not including the overlapping portion. For example, two signed samples having a symbol spacing, as illustrated herein, would be the samples n+1 and n+5 in 26.

Inside a Bit Correlation Module 120, a Bit Recovery Module 122 uses the Phase Differential Samples 115 to generate a Candidate Bit Stream 127, and a Binary Correlation Module 126 correlates the Candidate Bit Stream 127 with a Predetermined Synch Bit Pattern 124 to produce Bit Correlation Values 125. The values of Predetermined Synchronization Bit Pattern 124 are a sequence of single bits representing an expected sequence of single bit values that a specific synchronization pattern would produce. Operation of the Bit correlation module is discussed in greater detail with reference to FIG. 3.

Figure 4:
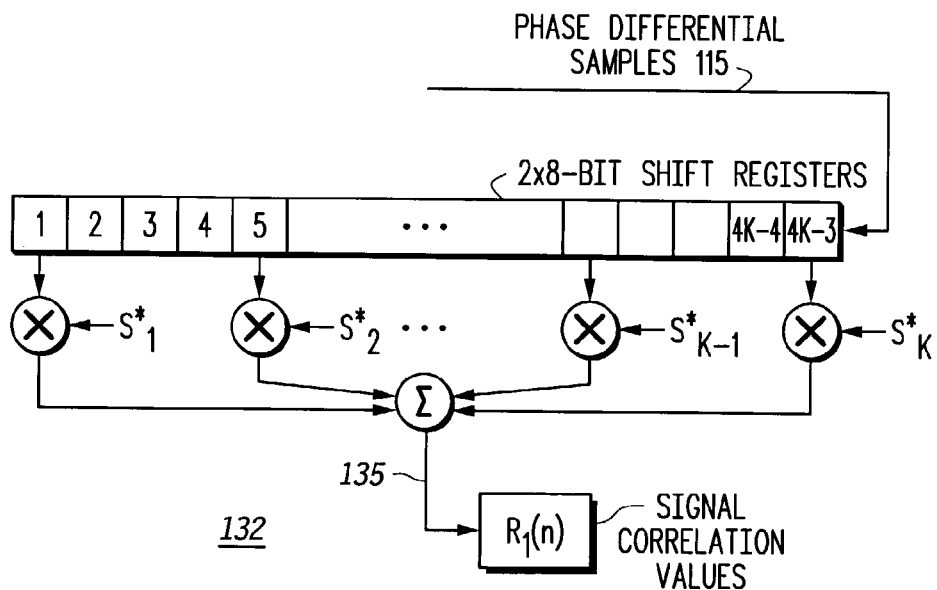
FIG. 4 is a detailed block diagram of the signal correlation module contained in a synch detection module of the present disclosure.

Inside a Signal Correlation Module 130, a Sample Correlation Module 132 correlates Phase Differential Samples 115 with a Predetermined Synch Symbol Pattern 134 to produce Signal Correlation Values 135. Since the signal values at symbol centers are equal in magnitude while their polarizations are different, the Predetermined Synchronization Symbol Pattern 134 can be represented with a sequence of bits representing the signal values of the sync patter signal at its symbol centers. By doing that, the multiplication and addition/subtraction in the correlation operation is reduced to addition/subtraction only, thus dramatically reducing the cost and power. In one embodiment, the Predetermined Synchronization Symbol Pattern 134 is associated with the Predetermined Synchronization Bit Pattern 124 in that they can be the same as Predetermined Synchronization Bit Pattern 124. Signal Correlation Values 135 represent a correlation value at the sample rate using every fourth sample. To gain calculation efficiency, the Signal Correlation Value 135 is calculated with only one sample per symbol, assumed to be at the center of the symbol. Refer to FIG. 4. With this efficient approach, the Predetermined Sync Symbol Pattern 134 is reduced to a sequence of symbol values represented by +1s or −1s, thus the multiplications are reduced to additions and subtractions.

Data Packet Detection Module 142 within Timing Detection Logic Module 140 uses Bit Correlation Values 125 to generate a peak arrival indicator. A peak determination module 144 uses the Peak Arrival Indicator and Signal Correlation Values 135 to generate the Symbol Center Sample Index 35 and Sample Interval Fraction 45.

Figure 3:
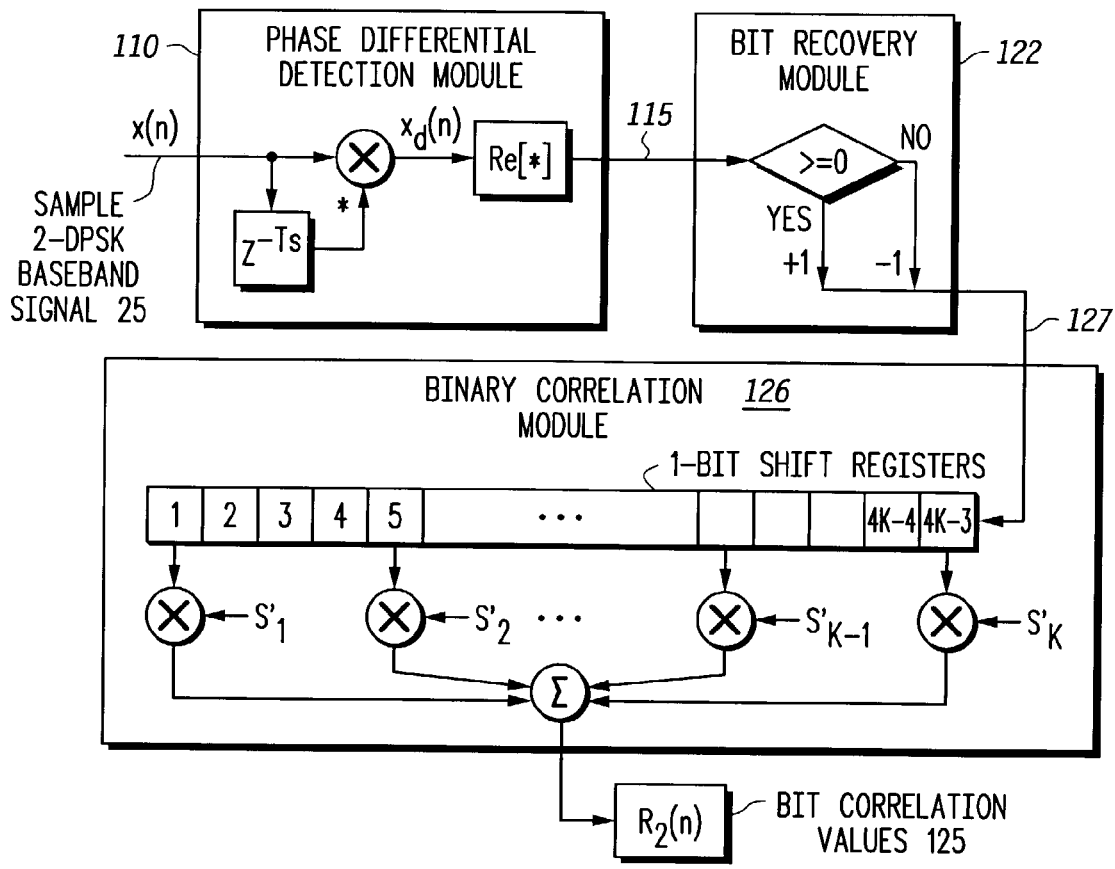
FIG. 3 is a detailed block diagram of the phase differential detection module and the bit correlation module contained in a synch detection module of the present disclosure.

In FIG. 3, the computation of complex-valued Phase Differential Samples 115 from complex-valued Sampled 2-DPSK Baseband Signal 25 by the Phase Differential Detection Module 110 is shown. Each complex sample x(n) from signal 25 is multiplied with the conjugate of the complex sample that appears one symbol time earlier. Using the complex conjugate calculation produces the phase difference $x_d(n)$ of the two samples.

In the Bit Recovery Module 122, the real parts of the Phase Differential Samples 115 are compared to a zero threshold to generate the Candidate Bit Stream 127 from the Phase Differential Samples 115, in which each bit of the Candidate Bit Stream 127 is taken to have a value of either +1 or −1. The imaginary parts of the Phase Differential Samples 115 are ignored in this embodiment because the Predetermined Sync Bit Pattern 124 is encoded with 1 as phase difference zero degree, and 0 as phase difference 180 degree. In the Binary Correlation Module 126, the Predetermined Synch Bit Pattern 124, having Kbits ($S'_1$–$S'_K$), each with a value of either +1 or −1, is correlated at the sample rate with bits from the Candidate Bit Stream 127, stored in a 1-bit shift register to generate the Bit Correlation Values 125. The indicated embodiment has a symbol separation of 4 samples. The results of this correlation, one multi-bit digital value for each sample time, constitute the Bit Correlation Values 125. Note that because the correlation in module 126 uses simple multiplication of single bit values rather than the much more costly multiplication of multi-bit digital values used in standard signal correlation, an efficiency is realized.

FIG. 4 shows a particular implementation of the Signal Correlation Module 130. A Predetermined Synch Symbol Pattern 134, having K single-bit values ($S^*_1$–$S^*_K$), each with a value of +1 or −1, is correlated by the Sample Correlation Module 132 with phase differential samples 115 at the symbol separation (every $4^{th}$ bit). The results are stored in a first-in-first-out register stack, for storing multi-bit values. The results of this correlation, one multi-bit digital value for each sample time, constitute the Signal Correlation Values 135. Note that because of the samples used in the correlation module 132 are at symbol separation, and because the predetermined sync symbols 134 are a sequence of +1s or −1s, the multiplication in the sample correlation module 132 is simplified to additions or subtractions.

Figure 5:
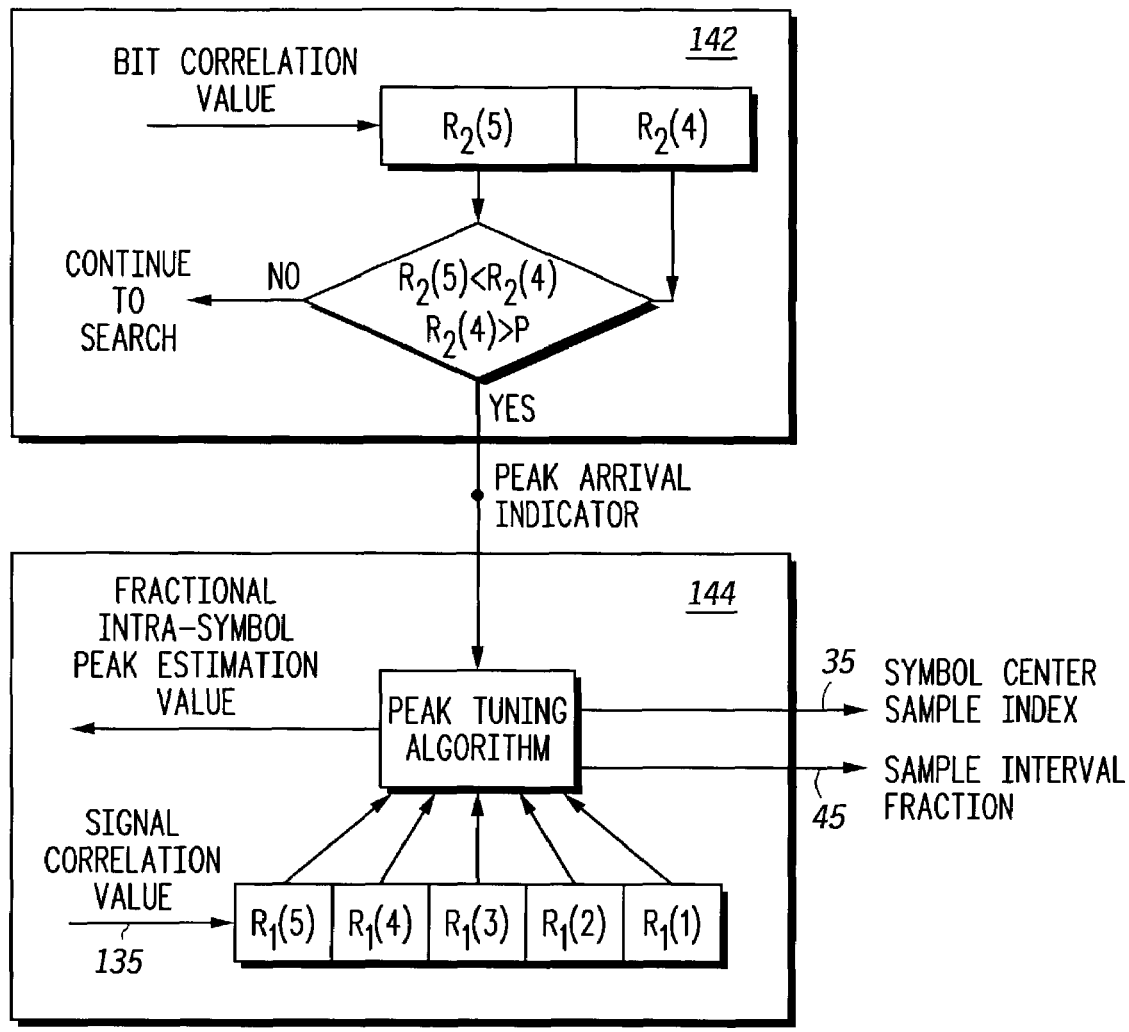
FIG. 5 is a detailed block diagram of the timing detection logic module that is contained in a synch detection module of the present disclosure.

FIG. 5 shows a particular embodiment of Timing detection Logic Module 140. The registers $R_2(4)$ and $R_2(5)$ in the Data Packet Detection Module 142 continuously store two successive values of the Bit Correlation Values 125. When the value in $R_2(4)$ is greater than a threshold P (appropriate to the specific synch pattern used in the packet format), and the value in $R_2(5)$ is less than the value in $R_2(4)$, the synch pattern or the packet has been detected, and the peak arrival indicator is asserted, which activates the Peak Determination Module 144.

The Peak Determination Module 144 continuously stores five successive Signal Correlation Values 135. These values are stored in the registers $R_1(1)$ through $R_1(5)$. Signal Correlation Value $R_1(4)$ and Bit Correlation Value $R_2(4)$ correspond to the same sample time, as do $R_1(5)$ and $R_2(5)$. When the peak arrival indicator is set, the values in the registers $R_1(1)$ through $R_1(5)$ are the signal correlation values spanning the symbol time immediately preceding the peak arrival indicator. A peak tuning algorithm in module 144 selects as the Symbol Center Sample Index 35 the registers $R_1(1)$ through $R_1(5)$, having the maximum value. The maximum value and its 2 adjacent values are used in a polynomial estimation to find a quadratic (second-degree) polynomial curve peak. This peak, based on a non-linear polynomial matched to the symbol correlation values, represents the true peak arrival time a higher resolution. The Symbol Center Sample Index 35 is the sample index prior to the true peak, and the Sample Interval Fraction 45 represents the fractional sample interval from the Symbol Center Sample Index 35 to the estimated true peak.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be a read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand-held computing device, a cable set-top box, an Internet capable device, such as a cellular phone, and the like.

In the preceding detailed description of the figures, reference has been made to the accompanying drawings which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical, chemical and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A differential phase shift signal receiver comprising:
    a demodulator comprising a first input to receive a differential phase shift signal, and an output to provide a differential phase shift base-band signal;
    an analog to digital sampling module comprising an input coupled to the output of the demodulator, and an output to provide a sampled differential phase shift base-band signal; and
    a synchronization detection module comprising:
        an input coupled to the output of the analog to digital sampling module;
        a first output to provide a symbol center sample index that identifies a sample of the sampled differential phase shift base-band signal having a predefined relationship to a center of a received symbol;
        a second output to provide a sample interval fraction that identifies a fractional portion of a sample period from the sample identified by the symbol center sample index to an estimated center of the received symbol;
        a phase differential detection module to receive the sampled differential phase shift base-band signal and to produce a sequence of phase differential samples;
        a signal correlation module responsive to the phase differential detection module, the signal correlation module including a sample correlation module, the sample correlation module having a first input to receive the sequence of phase differential samples and a second input to receive a predetermined synchronization symbol pattern, pattern associated with predetermined synchronization bit pattern, the sample correlation module to produce symbol correlation values; and
        a timing detection module responsive to the signal correlation module to generate the symbol center sample index and the sample interval fraction.

2. The receiver of claim 1, wherein the predefined relationship of the sample to the center of the received symbol identifies the sample immediately before the center of the received symbol.

3. The receiver of claim 2, wherein the received symbol is a portion of a synchronization pattern.

4. The receiver of claim 1, wherein the received symbol is a portion of a synchronization pattern.

5. The receiver of claim 1, wherein the synchronization detection module further comprises:
    a bit correlation module responsive to the phase differential detection module, the bit correlation module including a bit recovery module responsive to the sequence of phase differential samples and producing a recovered candidate bit stream, the bit correlation module including a binary correlation module, the binary correlation module having a first input to receive the recovered candidate bit stream and a second input to receive the predetermined synchronization bit pattern, the binary correlation module to produce bit correlation values; and
    the timing detection module further responsive to the bit correlation module.

6. The receiver of claim 5, wherein the timing detection module includes a data packet detection module to detect arrival of a data packet based on a comparison of the bit correlation values.

7. The receiver of claim 5, further comprising a peak tuning module to determine the sample interval fraction value using polynomial estimation.

8. The receiver of claim 7, wherein the polynomial estimation utilizes an estimated maximum value of a non-liner polynomial matched to the symbol correlation values.

9. The receiver of claim 5, wherein the differential phase shift signal is derived from a received wireless signal.

10. The receiver of claim 9, wherein the wireless signal is a Bluetooth standard compliant signal.

11. The receiver of claim 5, wherein the signal correlation module performs multiplication of a multi-bit value associated with at least one of the phase differential samples with a 1-bit value associated with at least one sample of the predetermined synchronization symbol pattern.

12. The receiver of claim 5, wherein the signal correlation module performs a correlation on a selected subset of the phase differential samples.

13. The receiver of claim 12, wherein the selected subset includes every fourth phase differential sample from the sequence of phase differential samples.

14. The receiver of claim 5, wherein the predetermined synchronization bit pattern is the same as the predetermined synchronization symbol pattern.

15. A differential phase shift signal receiver comprising:
a phase differential detection module to receive a differential phase shift keying signal and to produce a sequence of phase differential samples;
a bit correlation module responsive to the phase differential detection module, the bit correlation module including a bit recovery module responsive to the sequence of phase differential samples and producing a recovered candidate bit stream, the bit correlation module including a binary correlation module, the binary correlation module having a first input to receive the recovered candidate bit stream and a second input to receive a predetermined synchronization bit pattern, the binary correlation module to produce bit correlation values;
a signal correlation module responsive to the phase differential detection module, the signal correlation module including a sample correlation module, the sample correlation module having a first input to receive the sequence of phase differential samples and a second input to receive a predetermined synchronization symbol pattern wherein the sample correlation module performs a correlation on a selected subset of the phase differential samples, the signal correlation module to produce signal correlation values; and
a timing detection logic module responsive to the bit correlation module and responsive to the signal correlation module, the timing detection logic module generating a synchronization indicator based on the bit correlation values and the signal correlation values.

16. A method of synchronizing a received differential phase shift signal, the method comprising:
receiving a differential phase shift keying signal;
demodulating the differential phase shift keying signal to produce a baseband differential phase shift keying signal;
determining a sequence of phase differential samples derived from the baseband differential phase shift keying signal;
recovering a candidate bit stream from the sequence of phase differential samples;
correlating the candidate bit stream with a predetermined synchronization bit pattern to produce bit stream correlation values;
correlating the sequence of phase differential samples at a symbol separation with a predetermined synchronization symbol pattern to produce signal correlation values;
comparing the bit stream correlation values with a threshold to detect a data packet;
performing peak tuning of the detected data packet to determine a sample interval fraction based on the signal correlation values; and
determining synchronization timing with respect to a start time of the detected data packet based on the detected data packet and the sample interval fraction.

17. The method of claim 16, wherein a subset of phase differential samples within a set of the phase differential samples is used during correlation with the predetermined synchronization symbol pattern.

18. The method of claim 17, wherein the subset includes every fourth sample of the set of the phase differential samples.

19. The method of claim 16, further comprising determining the sample interval fraction using polynomial estimation.

20. The method of claim 19, wherein the polynomial estimation further includes utilizing an estimated maximum value of a non-linear polynomial matched to the signal correlation values.

21. The method of claim 16, wherein the received differential phase shift keying signal is a Bluetooth standard compliant signal.

22. The method of claim 16, wherein correlating the sequence of phase differential samples with the predetermined synchronization symbol pattern comprises performing multiplication of a multibit value associated with at least one of the phase differential samples with a 1-bit value of the predetermined synchronization symbol pattern.

23. The method of claim 16, wherein the predetermined synchronization bit pattern is the same as the predetermined synchronization symbol pattern.

* * * * *

UNITED STATES PATENT AND TRADEMARK OFFICE
CERTIFICATE OF CORRECTION

PATENT NO. : 6,973,142 B2
DATED : December 6, 2005
INVENTOR(S) : Weizhong Chen and Leo Dehner It is certified that error appears in the above-identified patent and that said Letters Patent is hereby corrected as shown below:

Column 6,
Lines 21-22, change ", pattern asociated with predetermined synchronization bit pattern" to --, a predetermined synchronization symbol patern associated with the predetermined synchronization bit pattern --.
Line 60, change "liner" to read -- linear --.

Signed and Sealed this

Twenty-eighth Day of March, 2006

JON W. DUDAS
*Director of the United States Patent and Trademark Office*